(12) United States Patent
Bidnyk et al.

(10) Patent No.: US 7,561,764 B2
(45) Date of Patent: Jul. 14, 2009

(54) INTEGRATED REFLECTOR FOR PLANAR LIGHTWAVE CIRCUITS

(75) Inventors: Serge Bidnyk, Ottawa (CA); Matt Pearson, Ashton (CA); Ashok Balakrishnan, Ottawa (CA)

(73) Assignee: Enablence Inc., Kanata (CA)

( * ) Notice: Subject to any disclaimer, the term of this patent is extended or adjusted under 35 U.S.C. 154(b) by 0 days.

(21) Appl. No.: 12/026,745

(22) Filed: Feb. 6, 2008

(65) Prior Publication Data

US 2008/0226221 A1  Sep. 18, 2008

Related U.S. Application Data

(60) Provisional application No. 60/894,483, filed on Mar. 13, 2007.

(51) Int. Cl.
*G02B 6/12* (2006.01)
(52) U.S. Cl. .............. 385/14; 385/36; 385/49; 385/52; 385/129; 385/130
(58) Field of Classification Search ............ None
See application file for complete search history.

(56) References Cited

U.S. PATENT DOCUMENTS

| 6,115,521 | A | 9/2000 | Tran et al. ............ 385/52 |
| 6,845,184 | B1* | 1/2005 | Yoshimura et al. ....... 385/14 |
| 7,068,885 | B2 | 6/2006 | Bidnyk et al. .......... 385/37 |
| 7,149,387 | B2 | 12/2006 | Balakrishnan et al. ..... 385/37 |
| 7,151,635 | B2 | 12/2006 | Bidnyk et al. ......... 359/572 |

| 2003/0039455 | A1* | 2/2003 | Ouchi ................ 385/88 |
| 2006/0056757 | A1 | 3/2006 | Ouchi et al. ........... 385/14 |
| 2007/0183718 | A1* | 8/2007 | Bae et al. ............. 385/47 |

FOREIGN PATENT DOCUMENTS

| JP | 2004170684 | 6/2004 |
| JP | 2006003818 | 1/2006 |

OTHER PUBLICATIONS

Takahara, "Optoelectronic Multichip Module Packaging Technologies and Optical Input/Output Interface Chip-Level Packages for the Next Generation of Hardware Systems", IEEE Journal of Selected Topics in Quantum Electronics, vol. 9, No. 2, 443-451, 2003.
Kato et al., "PLC Hybrid Integration Technology and Its Application to Photonic Components", IEEE Journal of Selected Topics in Quantum Electronics, vol. 6, No. 1, 4-13, 2000.
International Search Report for corresponding application No. PCT/CA2008/000263, filed Feb. 12, 2008.

* cited by examiner

*Primary Examiner*—Sung H Pak
*Assistant Examiner*—Chad H Smith
(74) *Attorney, Agent, or Firm*—Teitelbaum & MacLean; Neil Teitelbaum; Doug MacLean

(57) ABSTRACT

A reflector chip of the present invention integrates a planar lightwave circuit (PLC) waveguide wafer and an active component, such as a photo-detector or laser, e.g. vertical cavity surface emitting laser. Typically, the PLC waveguide wafer includes a waveguide core region bound by upper and lower cladding layers. An end of the waveguide core region is mounted within a channel, trench, notch or recess within the bottom surface of the body of the reflector chip. A V-notch is also formed in the bottom surface of the body of the reflector, including a reflective surface, which redirects the light between the active component and the waveguide core region.

20 Claims, 3 Drawing Sheets

INTEGRATED REFLECTOR FOR PLANAR LIGHTWAVE CIRCUITS

CROSS-REFERENCE TO RELATED APPLICATIONS

The present invention claims priority from U.S. Patent Application No. 60/894,483 filed Mar. 13, 2007, which is incorporated herein by reference.

TECHNICAL FIELD

The present invention relates to an integrated reflector for use in optical communication and spectroscopy, and in particular to a reflector for the integration of passive and active components in planar waveguide circuits.

BACKGROUND OF THE INVENTION

In conventional planar lightwave circuits (PLCs), light is confined to either an optical slab or waveguide, defined by a core region, possessing a higher reflective index contrast relative to surrounding cladding material, e.g. upper, lower and sidewall cladding. The optical core runs parallel to the wafer surface, thus restricting the light to a propagation direction that is predominantly parallel to the wafer surface. The direction of the light propagation largely favors integration of planar lightwave circuits with a certain type of active component, such as waveguide photo-detectors and edge-emitting lasers, both of which rely on the light propagating parallel to the wafer surface. However, many other active components, most notably surface photo-detectors and vertical-cavity surface emitting lasers (VCSELs) require that the light enters or exits the chip in the direction that is largely perpendicular to the wafer surface, which makes it difficult to integrate surface photo-detectors and VCSELs with planar lightwave circuits.

Furthermore, certain active components require that the light undergoes filtering before being coupled into the planar lightwave circuits. For example, there might be a need to perform filtering of light before it can be coupled with a surface photodetector. Conversely, emission from the VCSEL might require filtering of amplified spontaneous emission (ASE) or wavelength locking before it can be integrated with a planar lightwave circuit. For a diverging light having wide angular content (as opposed to plane wave), e.g. light exiting a waveguide core, it is advantageous to position the filter perpendicular to the propagation direction of the light, as described in this invention. Perpendicular-oriented filter provides the most consistent performance for the spectral response of light entering the filter at various angles.

Consequently, there is a need for an integrated reflector that can enable integration of surface photodetectors and VCSELs with a planar lightwave circuit, as well as to provide additional functionality, such as filtering of light.

An object of the present invention is to overcome the shortcomings of the prior art by providing a vertical reflector chip, which enables the light to exit the optical plane within a planar lightwave circuit. The vertical reflector can optionally have a thin film coating that enables filtering of light of specific wavelength.

SUMMARY OF THE INVENTION

Accordingly, the present invention relates to a planar lightwave circuit device for integrating a planar lightwave circuit (PLC) chip including a waveguide having a core for guiding an optical signal along a first axis, and an active component for receiving the first optical signal from the core of the waveguide or for generating the first optical signal for transmission to the core of the waveguide, comprising:

a first reflector chip for mounting on the planar lightwave circuit chip, the first reflector chip having a recess for receiving an end of the first waveguide, and top surface for supporting the active component; and a first notch formed in the first reflector chip having a planar surface at an acute angle to the first axis for redirecting the optical signal between the core of the waveguide and the top surface of the first reflector chip.

Another aspect of the present invention relates to a planar lightwave circuit device, comprising:

a planar lightwave circuit (PLC) chip including a first waveguide having a core for guiding a first optical signal along a first axis;

a first reflector chip for mounting on the planar lightwave circuit chip, the first reflector chip having a recess for receiving an end of the first waveguide;

a first notch formed in the first reflector chip having a planar surface at an acute angle to the first axis for redirecting the first optical signal between the core of the first waveguide and a top surface of the first reflector chip; and a first active component mounted on the top surface of the first reflector chip for receiving the first optical signal from the core of the first waveguide or for generating the first optical signal for transmission to the core of the first waveguide.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
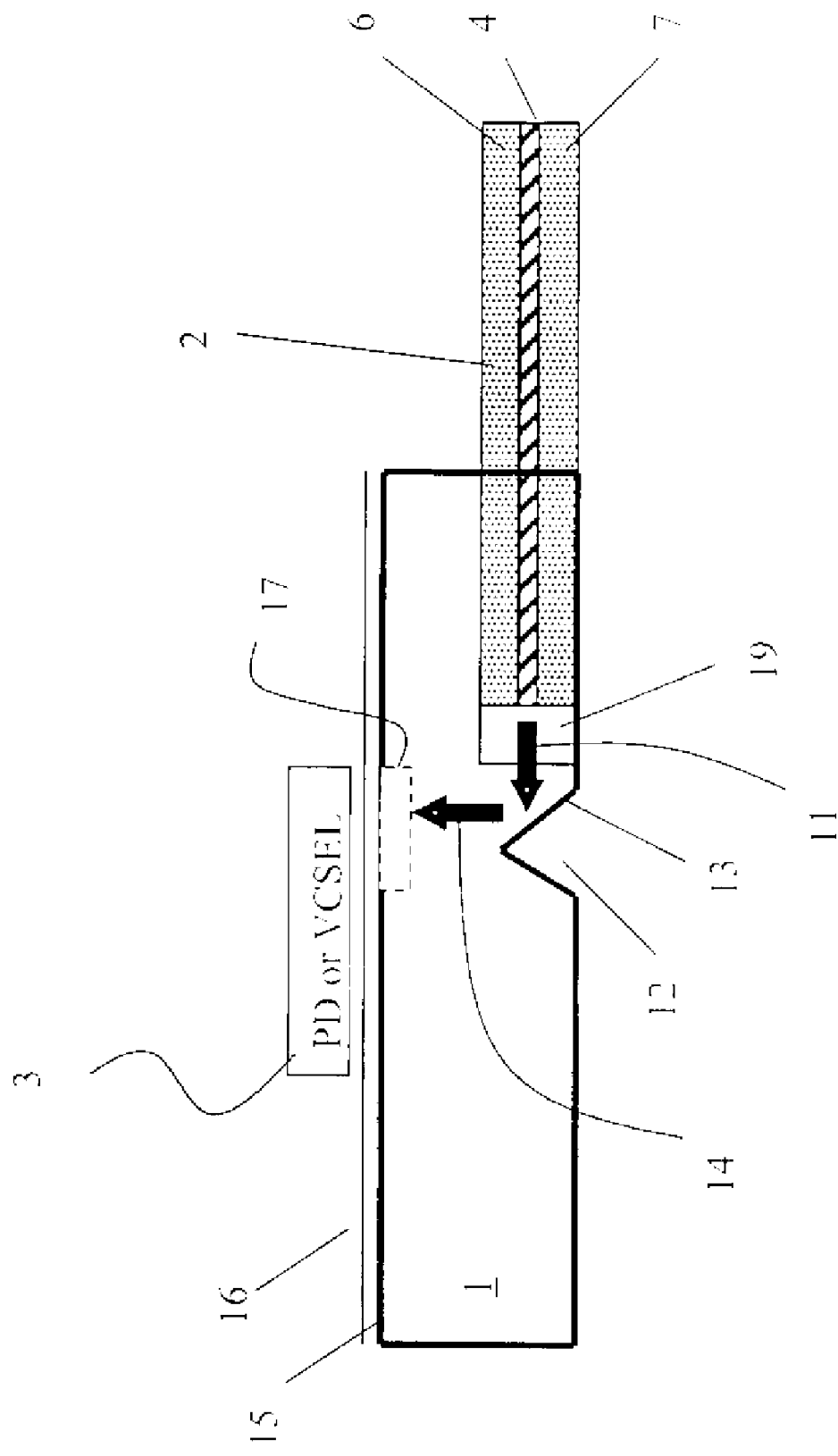
FIG. 1 is a side view of a reflector device mounted on a planar lightwave circuit.
Figure 2:
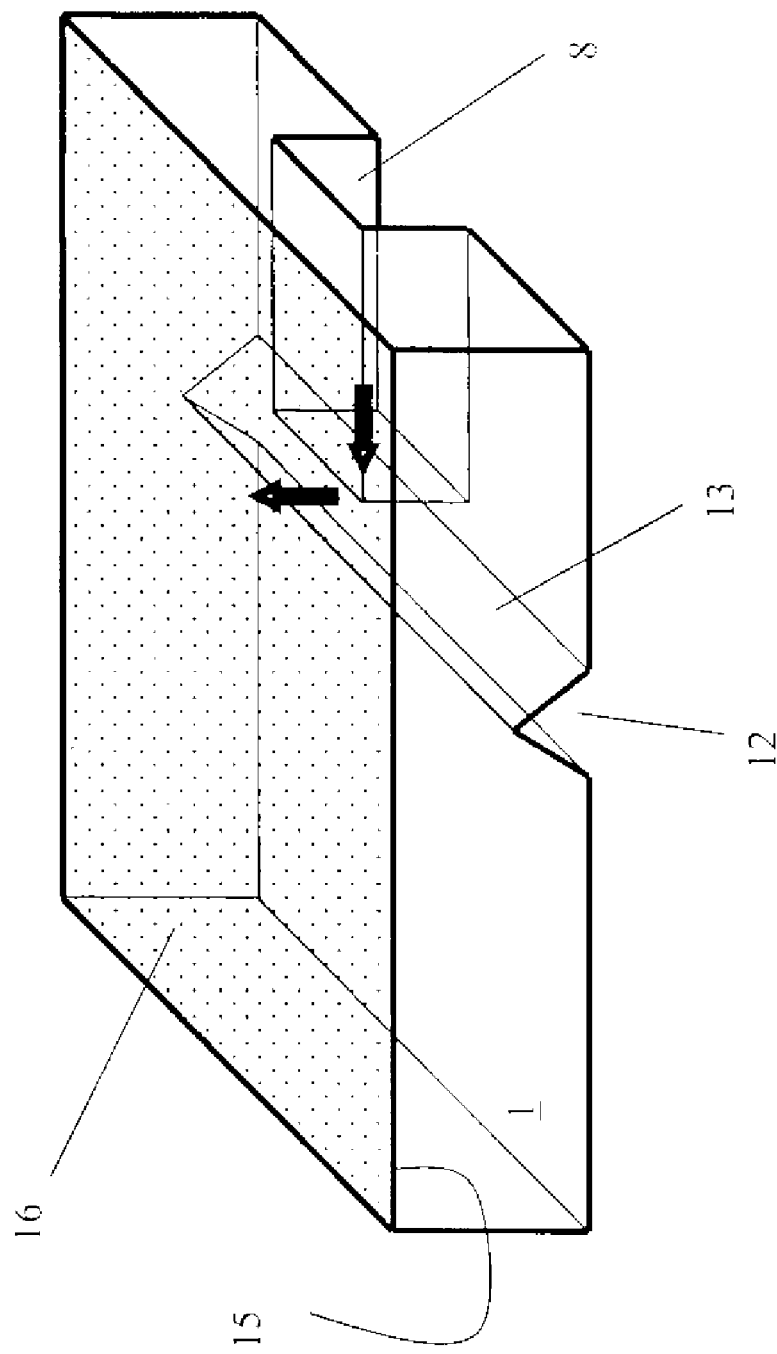
FIG. 2 is an isometric view of the reflector device of FIG. 1.

With reference to FIGS. 1 and 2, the present invention relates to a reflector chip 1 that integrates a planar lightwave circuit (PLC) waveguide wafer 2 and an active component 3, such as a photodetector or laser, e.g. vertical cavity surface emitting laser. Typically, the PLC waveguide wafer 2 includes a waveguide core region 4 bound by upper and lower cladding layers 6 and 7, respectively, as is well known in the art. An end of the waveguide core region 4 is mounted within a channel, trench, notch or recess 8 within the bottom surface of the body of the reflector chip 1, which is sized to receive the end of the PLC waveguide wafer 2. The reflector chip 1, is transparent, e.g. quartz based, to the light traveling in the waveguide wafer 2, and includes a body, which has features that are shaped in such a way as to deflect the light from the core region 4 of the PLC waveguide wafer 2 into a direction substantially perpendicular to the original propagation direction, i.e. perpendicular to the waveguide core region 4 of the waveguide wafer 2.

Initially, the light is confined to the core region 4 of a waveguide wafer 2, i.e. traveling generally along an axis or in a direction illustrated by arrow 11. Subsequently, the light exits the enclosed end of the core region 4 and enters the body of the reflector chip 1 until encountering a channel, trench, notch, V-groove or recess 12 within the bottom surface of the body of the reflector chip 1. Ideally, a V-groove is formed, e.g. etched or cut out, extending the width of the reflector chip 1 defining the recess 12. The key element of the recess 12 is an acute angled (32° to 58°, ideally 45°, to core region 4) planar surface 13 that serves as a tilted mirror. The planar surface 13 can be metallized or thin film coated to enhance the reflectivity. Alternatively, the planar surface 13 can be without any coating, and rely on total internal reflection, i.e. the angle of incidence of the light on the planar surface 13 and a refractive index difference between the material making up the reflector chip 1 and the material in the recess 12, e.g. air, results in total internal reflection of the light.

Ideally, after the light is redirected in a predominantly vertical direction along the axis or direction illustrated by arrow 14, the light exits an upper surface 15 of the body of the integrated reflector chip 1 at a near-normal incidence, although other non-normal angles, e.g. an acute angle up to 13°, of incidence are possible, and enters the active component 3, e.g. photodetector. The direction of the light is reversed when the active component 3 is a VCSEL placed on the upper surface 15 of the reflector chip 1. In this scenario, the light generated by VCSEL propagates downwardly through the body of the reflector chip 1 in the opposite direction to arrow 14, and is redirected by the tilted planar surface 13 into the core region 4 of the PLC waveguide wafer 2.

In some photo-detector applications, the initial demultiplexing filter, e.g. a PLC filter in the waveguide wafer 2, does not provide enough wavelength isolation, and needs to be slightly complemented by a second filter. The planar upper surface 15, substantially parallel to the PLC core region 4 and/or perpendicular to the light reflecting off of the reflector surface 13, forms a supporting surface upon which the photodetector PD can be mounted. The geometry, i.e. the planar upper surface 15, of the reflector chip 1 also enables a thinfilm filter (TFF) 16 to be added in the path of the light 14 before the light 14 hits the photo-detector PD. The mirror chip 1 is made using wafer processing techniques, and the proposed geometry allows the thin film filter 16 to also be deposited at wafer level. Several tens of thousands of mirror chips 1 can be fabricated on a single quartz wafer. (approx size is ~500×500 um). For a diverging light having wide angular content (as opposed to plane wave), e.g. light exiting a waveguide core, it is advantageous to position the filter 16 on the upper surface 15 perpendicular to the propagation direction of the light, instead of on the angle reflector surface 13. A perpendicular-oriented filter 16 provides the most consistent performance for the spectral response of light 14 entering the filter 16 at various angles.

For the embodiments in which the active component 3 is a laser, e.g. a VCSEL, the filter 16 can provide filtering of amplified spontaneous emission (ASE) or wavelength locking of the emitted beam before the light is integrated onto the PLC waveguide wafer 2. For wavelength locking, the filter 16 reflects a portion of the emitted signal at a desired emission wavelength for reflection back into the laser.

A lens 17 can be provided, preferably integrated into or onto the body of the reflector chip 1; however, the lens 17 can also be mounted separately or be a part of the active component, for collimating the light before passing through the TFF 16.

Ideally a space 19 between the PLC wafer 2 and the body of the reflector chip 1 is filled with index-matching material, e.g. adhesive, to eliminate any significant optical interfaces. A liquid adhesive will fill in rough spots in the edge of the reflector chip 1 caused by etching, and eliminate back reflection off a glass-air interface.

Figure 3:
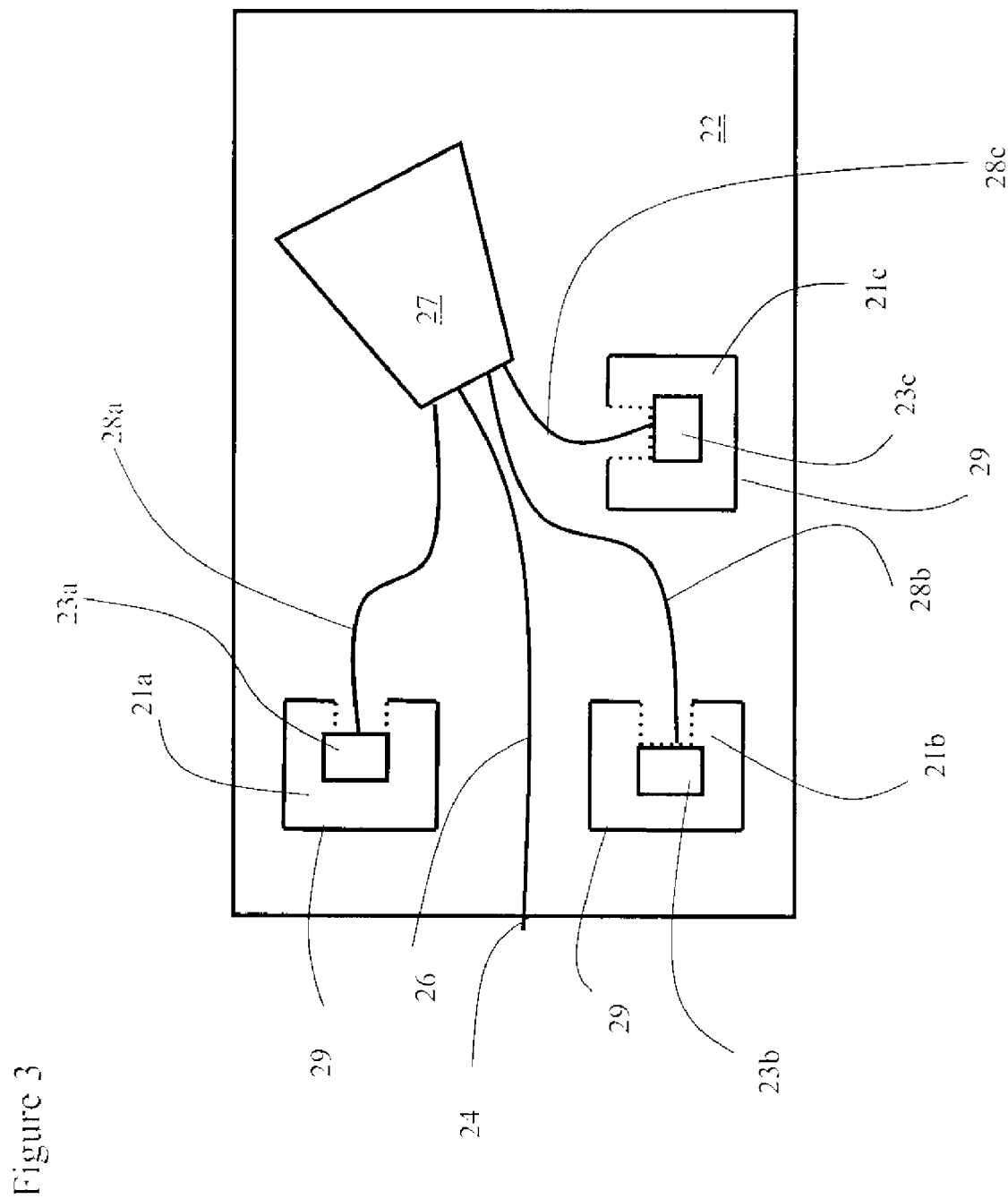
FIG. 3 is a plan view of a planar lightwave device including three reflector devices in accordance with the present invention.

With reference to FIG. 3, a more complicated PLC circuit includes first and second reflector chips 21a and 21b (identical to reflector chip 1 above) mounted on a PLC wafer 22, and supporting first and second active components 23a and 23b, e.g. photodetectors or VCSELs. The PLC wafer 22 includes in input/output port 24 for launching or outputting optical signals into or from an input/output waveguide 26. The input/output waveguide 26 guides light between the input/output port 24 and a optical filter region 27. Ideally, the optical filter region 27 includes a slab waveguide region with one or more refractive dispersion grating, such as those disclosed in U.S. Pat. No. 7,068,885, issued Jun. 27, 2006 to Bidnyk et al, and U.S. Pat. No. 7,151,635 issued Dec. 19, 2006 to Balakrishnan et al. and U.S. Pat. No. 7,149,387 issued Dec. 12, 2006 to Pearson et al, which are incorporated herein by reference, etched in ends thereof for dispersing the optical signal from the input/output port 24 into constituent wavelength channel sub-beams or for multiplexing wavelength channel sub-beams from first and second active components 23a and 23b into a single multiplexed optical beam. The dispersed constituent channel sub-beams are directed by the optical filter region 27 to separate output waveguides 28a and 28b, which guide the sub-beams to the first and second photodetectors 23a and 23b, respectively, via respective reflector chips 21a and 21b. When used as a multiplexer, the combined optical beam is output the input/output port 24 via input/output waveguide 26.

A bidirectional embodiment is provided when one of the active components, e.g. 23a is a laser or VCSEL, and the other active component, e.g. 23b, is a photodetector. Accordingly, as an input optical beam, launched via input/output port 24 and input/output waveguide 26 is being filtered and directed by the optical filter region 27 onto the waveguide 28b to photodetector 23b via the reflector chip 21b, an output optical beam is being launched onto waveguide 28a from laser 23a via reflector chip 21a and redirected by the optical filter region 27 onto the input/output waveguide 26 for output input/output port 24.

A bi-directional triplexer is formed by adding a third active component, in the form of a second photodetector 23c, mounted on a third reflector chip 21c, which is disposed in a third pit 29. Accordingly, the input optical signal includes a second optical wavelength channel, which the optical filter region 27 separates from the first optical wavelength channel and directs onto a third waveguide 28c. The second optical wavelength channel is guided along the third waveguide 28c to the second photodetector 23c via the third reflector chip 21c.

The reflector chips 21a, 21b and 21c, are mounted inside the pits, i.e. recesses 29, which are etched into the PLC wafer 22, whereby the ends of the output waveguides 28a, 28b and 28c protrude into the pits 29, wherein they are received in a channel, trench, notch or recess within the bottom surface of the body of the reflector chips 21a, 21b and 21c, respectively. As above the waveguides 28a, 28b and 28c include a core surrounded by upper, lower, and side cladding regions.

There are two methods used for immersing the ends of the waveguides 28a, 28b and 28c. In a first method, each pit 29 is initially filled with an index-matching epoxy and the reflector chips 21a, 21b and 21c are squeezed into the 'wet' area, ensuring the index-matching epoxy fills the gap between each reflector chip 21a, 21b and 21c and each PLC waveguide 28a, 28b and 28c, respectively. A second method includes mounting the reflector chips 21a, 21b and 21c using a 'dry' process, e.g. eutectic solder bonding to the PLC wafer 22, and then taking advantage of a low viscosity index-matching fluid. When applied to the general area of the pit/reflector chip, the index-matching fluid will wick into all small spaces therebetween and fill the gaps effectively the same way as above. Examples of index-matching fluids include index matching oils, gels, and epoxies, e.g. Epo-Tek™ 353ND, which has a refractive index substantially the same as glass, i.e. the silica waveguides 28a, 28b and 28c.

Preferably, a thin film filter is coated on top of a planar platform formed on the upper surface of the reflector chip 21b (and 21c, if included) providing increased isolation for the optical wavelength channel. Similarly, a thin film filter can be coated on top of the first reflector chip 21a to filter out unwanted portions of the generated laser light, e.g. ASE.

The reflector chips 21a, 21b and 21c do not have to be quartz; however, quartz is an ideal material, and a perfect index-match to most materials used in silica PLC systems, including index-matching epoxy. Accordingly, reflection losses between the PLC wafer 22 and the reflector chips 21a, 21b and 21c are minimized. Moreover, quartz provides the most standard substrate for TFF deposition. However, the reflector chips 21a, 21b and 21c could also be made in silicon or virtually any other material. The 45° mirror 13 can be made using mechanical V-groove manufacturing, directional etching technology, or be etched along crystal planes in a single-crystal material.

The design of the reflector chips 1, 21a, 21b and 21c simplifies the deposition of thin film filters 16 onto the top surface 15 of the integrated reflector 10. The thin film deposition can be done on a wafer level before the wafer is singulated into individual reflectors. Thin films 16 can be used not only to allow transmission of light in a desired wavelength range but also to suppress undesired light greatly improving the performance characteristics of the active elements.

The selection of the reflector architecture also facilitates subsequent integration thereof with both planar lightwave circuits and active components. The flat top surface 15 of the reflectors 1, 21a, 21b and 21c is suitable for passive pick-and-place hybridization using high throughput bonders. Additionally, active components 3, 23a, 23b and 23c can easily be placed on the top surface 15 of the reflector 1, 21a, 21b and 21c without a need of facilitating micro-optic components, such as collimating lenses.

Both the case of integration and the ability to filter light introduce dramatic simplification into the hybridization of active components 3, 23a, 23b and 23c with planar lightwave circuits 2, 22, resulting in greatly reduced alignment and assembly costs and ultimately leads to a more competitive product.

Applications of the present invention can be found in the field of integrated planar lightwave circuits for optical communications. The ability of thin film deposition on the lop surface can greatly enhance optical isolation of surface photo-detectors from undesired spectral components or filter VCSEL emission to suppress amplified spontaneous emission. Additional applications of the present invention are in the field spectroscopy, wherein the reflector chip 1 enables isolating specific spectroscopic signatures, as well as enabling integration of detection and excitation light sources.

We claim:

1. A planar lightwave circuit device, comprising:
    a planar lightwave circuit (PLC) chip including a first waveguide having a core for guiding a first optical signal along a first axis;
    a first reflector chip for mounting on the planar lightwave circuit chip, the first reflector chip having a recess for receiving an end of the first waveguide;
    a first notch formed in the first reflector chip having a planar surface at an acute angle to the first axis for redirecting the first optical signal between the core of the first waveguide and a top surface of the first reflector chip;
    a first active component mounted on the top surface of the first reflector chip for receiving the first optical signal from the core of the first waveguide or for generating the first optical signal for transmission to the core of the first waveguide; and
    a first pit in the PLC chip partially surrounding the end of the first waveguide for receiving the first reflector chip.

2. The planar lightwave circuit device according to claim 1, further comprising a thin film filter on the top surface of the first reflector chip for filtering the first optical signal between the first active component and the first waveguide.

3. The planar lightwave circuit device according to claim 1, further comprising a lens integrated into the first reflector chip for collimating the first optical signal passing through the top surface.

4. The planar lightwave circuit device according to claim 1, further comprising an index matching material in the first pit between the first waveguide and the first reflector chip having substantially the same index of refraction as the core of the first waveguide and the first reflector chip.

5. The planar lightwave circuit device according to claim 1, wherein the first active component comprises a first photo-detector for converting the first optical signal into an electrical signal.

6. The planar lightwave circuit device according to claim 5, further comprising a thin film filter on the top surface of the reflector chip for filtering the light providing greater isolation for the first optical signal traveling from the first waveguide to the first photo-detector.

7. The planar lightwave circuit device according to claim 1, wherein the planar surface of the first notch comprises a thin film filter or a reflective coating.

8. The planar lightwave circuit device according to claim 1, wherein the acute angle of the planar surface is disposed at an angle to ensure total internal reflection of the light.

9. The planar lightwave circuit device according to claim 1, wherein the first reflector chip has substantially the same index of refraction as the core of the first wave guide.

10. The planar lightwave circuit device according to claim 9, further comprising an index matching material between the first waveguide and the first reflector chip having substantially the same index of refraction as the core of the first waveguide and the first reflector chip.

11. The planar lightwave circuit device according to claim 1, wherein the acute angle is between 32° and 58° for redirecting the first optical signal from traveling along the first axis to being substantially perpendicular to the first axis and at normal incidence through the top surface.

12. A planar lightwave circuit device, comprising:
    a planar lightwave circuit (PLC) chip including a first waveguide having a core for guiding a first optical signal along a first axis;
    a first reflector chip for mounting on the planar lightwave circuit chip, the first reflector chip having a recess for receiving an end of the first waveguide;
    a first notch formed in the first reflector chip having a planar surface at an acute angle to the first axis for redirecting the first optical signal between the core of the first waveguide and a top surface of the first reflector chip; and
    a first active component mounted on the top surface of the first reflector chip for receiving the first optical signal from the core of the first waveguide or for generating the first optical signal for transmission to the core of the first waveguide;
    wherein the first active component comprises a laser supported on the top surface for launching the first optical signal into the first waveguide;
    wherein the PLC chip further comprises:
        an input port for receiving a second optical signal from external to the PLC chip, and for outputting the first optical signal;
        an input/output waveguide optically coupled to the input port for guiding the first and second optical signals;
        a slab waveguide region optically coupled to the input/output waveguide having a diffraction grating formed in one edge thereof for redirecting the second optical signal, and for receiving and redirecting the first optical signal from the first waveguide to the input/output waveguide;

a second waveguide including a core optically coupled to the slab waveguide region for receiving and guiding the second optical signal; and wherein the planar lightwave circuit device further comprises:

a second reflector chip for mounting on the planar lightwave circuit chip, the second reflector chip having a recess for receiving an end of the second waveguide;

a second notch formed in the second reflector chip having a planar surface at an acute angle to the first axis for redirecting the second optical signal between the core of the second waveguide and a top surface of the second reflector chip; and a first photo-detector mounted on the top surface of the second reflector chip for receiving the second optical signal from the core of the second waveguide.

13. The planar lightwave circuit device according to claim 12, further comprising a thin film filter on the top surface of the first reflector chip for filtering the first optical signal emitted from the laser to eliminate amplified spontaneous emissions.

14. The planar lightwave circuit device according to claim 12, further comprising a thin film filter on the top surface of the first reflector chip for reflecting a portion of the first optical signal emitted from the laser back into the laser to provide wavelength locking of the laser.

15. The planar lightwave circuit device according to claim 1, wherein the PLC chip further comprises:

an input port for receiving a second optical signal from external to the PLC chip, and for outputting the first optical signal;

an input/output waveguide optically coupled to the input port for guiding the first and second optical signals;

a slab waveguide region optically coupled to the input/output waveguide having a diffraction grating formed in one edge thereof for redirecting the second optical signal, and for receiving and redirecting the first optical signal from the first waveguide to the input/output waveguide;

a second waveguide including a core optically coupled to the slab waveguide region for receiving and guiding the second optical signal;

wherein the planar lightwave circuit device further comprises:

a second reflector chip for mounting on the planar lightwave circuit chip, the second reflector chip having a recess for receiving an end of the second waveguide;

a second notch formed in the second reflector chip having a planar surface at an acute angle to the first axis for redirecting the second optical signal between the core of the second waveguide and a top surface of the second reflector chip; and a second photo-detector mounted on the top surface of the second reflector chip for receiving the second optical signal from the core of the second waveguide.

16. The PLC device according to claim 15, further comprising:

a third waveguide formed in the PLC chip optically coupled to the slab waveguide region for receiving and guiding a third optical signal received via the input/output port with the second optical signal, the second and third optical signals being dispersed by said diffraction grating and redirected to the second and third waveguides, respectively;

a third reflector chip for mounting on the planar lightwave circuit chip, the third reflector chip having a recess for receiving an end of the third waveguide;

a third notch formed in the third reflector chip having a planar surface at an acute angle to the first axis for redirecting the third optical signal between the core of the third waveguide and a top surface of the third reflector chip; and a third photo-detector mounted on the top surface of the third reflector chip for receiving the third optical signal from the core of the third waveguide.

17. A planar lightwave circuit device for integrating a planar lightwave circuit (PLC) chip including a waveguide having a core for guiding an optical signal along a first axis, and an active component for receiving the first optical signal from the core of the waveguide or for generating the first optical signal for transmission to the core of the waveguide, comprising:

a first reflector chip for mounting on the planar lightwave circuit chip, the first reflector chip having a recess for receiving an end of the first waveguide, and top surface for supporting the active component; and a first notch formed in the first reflector chip having a planar surface at an acute angle to the first axis for redirecting the optical signal between the core of the waveguide and the top surface of the first reflector chip; and a first pit in the PLC chip partially surrounding the end of the first waveguide for receiving the first reflector chip.

18. The planar lightwave circuit device according to claim 17, further comprising a thin film filter on the top surface of the reflector chip for filtering the optical signal at substantially normal incidence between the active component and the core of the wave guide.

19. The planar lightwave circuit device according to claim 18, wherein the active component comprises a laser supported on the thin film filter for launching the optical signal into the first waveguide; wherein the thin film filter filters the first optical signal emitted from the laser to eliminate amplified spontaneous emissions or to provide wavelength locking of the laser.

20. The PLC device according to claim 12, further comprising:

a third waveguide formed in the PLC chip optically coupled to the slab waveguide region for receiving and guiding a third optical signal received via the input/output port with the second optical signal, the second and third optical signals being dispersed by said diffraction grating and redirected to the second and third waveguides, respectively;

a third reflector chip for mounting on the planar lightwave circuit chip, the third reflector chip having a recess for receiving an end of the third waveguide;

a third notch formed in the third reflector chip having a planar surface at an acute angle to the first axis for redirecting the third optical signal between the core of the third waveguide and a top surface of the third reflector chip; and a third photo-detector mounted on the top surface of the third reflector chip for receiving the third optical signal from the core of the third waveguide.

* * * * *